(12) United States Patent
Nicot (10) Patent No.: US 6,402,196 B1
(45) Date of Patent: Jun. 11, 2002

(54) STEERING WHEEL ARMATURE WITH INTEGRATED OR DIRECTLY MOUNTED TORQUE SENSOR FOR VEHICLE STEERING DEVICE

(75) Inventor: Christophe Nicot, Epagny (FR)

(73) Assignee: S.N.R. Roulements, Cedex (FR)

( * ) Notice: Subject to any disclaimer, the term of this patent is extended or adjusted under 35 U.S.C. 154(b) by 0 days.

(21) Appl. No.: 09/601,637

(22) PCT Filed: Feb. 3, 1999

(86) PCT No.: PCT/FR99/00225

§ 371 (c)(1),
(2), (4) Date: Aug. 4, 2000

(87) PCT Pub. No.: WO99/39962

PCT Pub. Date: Aug. 12, 1999

(30) Foreign Application Priority Data

Feb. 4, 1998 (FR) .............................................. 98 01294

(51) Int. Cl.[7] .................................................. B62D 1/04
(52) U.S. Cl. ................... 280/771; 180/443; 73/862.325
(58) Field of Search ................................. 280/771, 731; 180/400, 412, 443, 446; 73/862.321, 862.325; 74/552

(56) References Cited

U.S. PATENT DOCUMENTS

| | | | |
|---|---|---|---|
| 1,488,155 A | * | 3/1924 | Kadel |
| 4,532,567 A | * | 7/1985 | Kade |
| 4,984,474 A | * | 1/1991 | Matsushima et al. |
| 5,009,110 A | * | 4/1991 | Lang et al. |
| 5,090,731 A | * | 2/1992 | Fujita et al. |
| 5,195,383 A | * | 3/1993 | Tanaka et al. |
| 5,237,880 A | * | 8/1993 | Dobler et al. |
| 5,450,761 A | * | 9/1995 | Zilberman et al. |
| 5,501,110 A | * | 3/1996 | Peilloud et al. |
| 5,704,633 A | * | 1/1998 | Durrani et al. |
| 5,731,529 A | * | 3/1998 | Nicot |
| 6,190,264 B1 | * | 2/2001 | Al-Rawi |

FOREIGN PATENT DOCUMENTS

| | | |
|---|---|---|
| EP | 0442091 A1 | 8/1991 |
| EP | 0691254 A1 | 1/1996 |
| EP | 0726185 A1 | 8/1996 |
| EP | 0775624 A2 | 5/1997 |
| FR | 2478004 | 9/1981 |
| FR | 2718699 | 10/1995 |
| WO | WO 96/25300 | 8/1996 |
| WO | WO 97/08527 | 3/1997 |

* cited by examiner

Primary Examiner—Avraham Lerner
(74) Attorney, Agent, or Firm—Perman & Green, LLP (57) ABSTRACT

The invention concerns an instrumented steering wheel comprising a torque sensor integrated or directly mounted in its armature. The torque measurement enables power steering control. The rigid monobloc torquemeter is unaffected by electromagnetic interference and is inexpensive.

32 Claims, 12 Drawing Sheets

STEERING WHEEL ARMATURE WITH INTEGRATED OR DIRECTLY MOUNTED TORQUE SENSOR FOR VEHICLE STEERING DEVICE

BACKGROUND OF THE INVENTION

The invention relates to the technical field of vehicle steering wheels.

The invention concerns more particularly dynamometric steering wheels.

Steering wheel means a manually controlled device connected to the front wheels and used by the driver to direct the vehicle.

Field of the Invention

Conventionally, the steering wheel is connected to the front wheels by a steering column, that is to say a tubular element fixed to the bodywork, under the dashboard, which guides and supports the transmission shaft connected to the steering wheel.

This steering column is associated with a steering box, for example a rack, converting the circular movement of the steering wheel into an angular movement of the steering rods which cause the wheels to steer.

The invention also concerns the steering wheels integrated into the steering device in which the wheels are not connected by a series of mechanical components with the steering wheel.

Steering wheels conventionally consist of a toric rim connected by at least one connecting arm to a hub cooperating with the steering shaft.

Reference can be made, for example, to the following documents: EP-726 185, EP-691 254, EP-504 963, EP-412 605, EP-465 296, EP-390 001, EP-368 386, EP-329 542, EP-309 316, FR-2 679 859, FR-2 674 207, FR-2 662 132, FR-2 664 223, FR-2 620 996.

Steering wheels frequently serve as a support for comfort or safety equipment, without any functional link with the steering column.

Such is the case, for example, with steering columns forming a support for an inflatable airbag.

Inflatable airbag means here a passive retaining device formed by a flexible casing inflated in the event of impact by an explosive system, so as to fill a space in front of the driver.

Steering wheels with an integral airbag conventionally comprise a body formed by a rim and arms connecting to a hollow hub in which a central airbag support hub is housed.

Reference can be made, for example, to the following documents: EP-728 652, EP-788 935, FR-2 718 699, FR-2 716 857, FR-2 709 461.

Accessories other than airbags are sometimes integrated into or housed in the hollow of steering wheels: horns, indicator lights etc, these accessories having no functional link with the steering wheel and not fundamentally modifying the structure thereof.

Reference can be made, for example, to the following documents: EP-744 329, EP-668 205, EP-647 540, WO-96/255 28, WO-94/112 30, FR-2 681 570, FR-2 633 239, FR-2 633 237.

SUMMARY OF THE INVENTION

The invention relates to an instrumented steering wheel structure, the sensor 25 integrated into or attached to the structure or frame of the steering wheel being a torque sensor or torque meter.

To this end, the invention relates, according to a first aspect, to a steering wheel frame, notably for a motor vehicle, having ergonomic means for gripping the steering wheel to control the rotation of a steering shaft;

means of mounting the steering wheel frame on the said steering shaft comprising a means of measuring the stresses applied to the steering shaft by the manoeuvring of the steering wheel.

The means of measuring the stresses applied to the steering shaft by the manoeuvring of the steering wheel comprise at least one torque sensor.

In one embodiment, the steering shaft is a component of a steering column mechanically connecting the wheels to the steering wheel.

In another embodiment, the steering shaft is a principal shaft of a decoupled steering device.

According to one characteristic, the means of measuring the stresses applied to the steering shaft by the manoeuvring of the steering wheel is a small-movement sensor.

The frame comprises an annular rim and at least one arm connecting the rim to the stress measuring means.

The frame comprises at least one ergonomic grip for gripping the steering wheel.

The grip is fixed by clamping members to the periphery of the steering wheel or to one of the arms of the steering wheel.

The grip supports means of controlling components of the vehicle.

The rim comprises at least two substantially complementary tubes shaped in a portion of a ring, each tube comprising a portion of the rim and at least one-radially folded end part forming at least part of an arm of the frame.

The radial arms are connected to the rim, the end part of one or of each arm being inserted in a corresponding slot in the rim, in one embodiment.

In another embodiment, the radial arm or arms are made from pressed sheet metal, the end part of one or each arm being coiled on the rim and welded thereto.

The frame includes means of connecting an inflatable airbag device.

In a variant, the frame has means of connection either with an insert encased in padding, an inflatable airbag mechanism being encased in the padding, or with a plate connecting the steering wheel gripping means to the steering shaft.

The torque sensor has:

a first movable external ring;

a second external ring, substantially unstressed, placed at a distance from the movable external ring;

an internal ring fixed with respect to rotation to the steering shaft to which the torque to be measured is applied, the movable external ring being able to be rigidly fixed to the steering wheel frame, the movable external ring being connected to the internal ring by at least one elastically deformable means;

the external ring, substantially unstressed, being connected to the internal ring by at least one substantially unstressed means;

the sensor comprising means of measuring small relative movements of the movable external ring with respect to the substantially unstressed external ring when a torque is applied to the steering shaft via the steering wheel frame.

Other objects and advantages of the invention will emerge during the following description of embodiments, a description which will be given with reference to the accompanying drawings, in which:

BRIEF DESCRIPTION OF THE DRAWINGS

FIGS. 12 and 13 are views in transverse section of a steering device according to one embodiment; FIG. 13 being a detail view of FIG. 12.

DETAILED DESCRIPTION OF THE PREFERRED EMBODIMENTS

Figure 1:
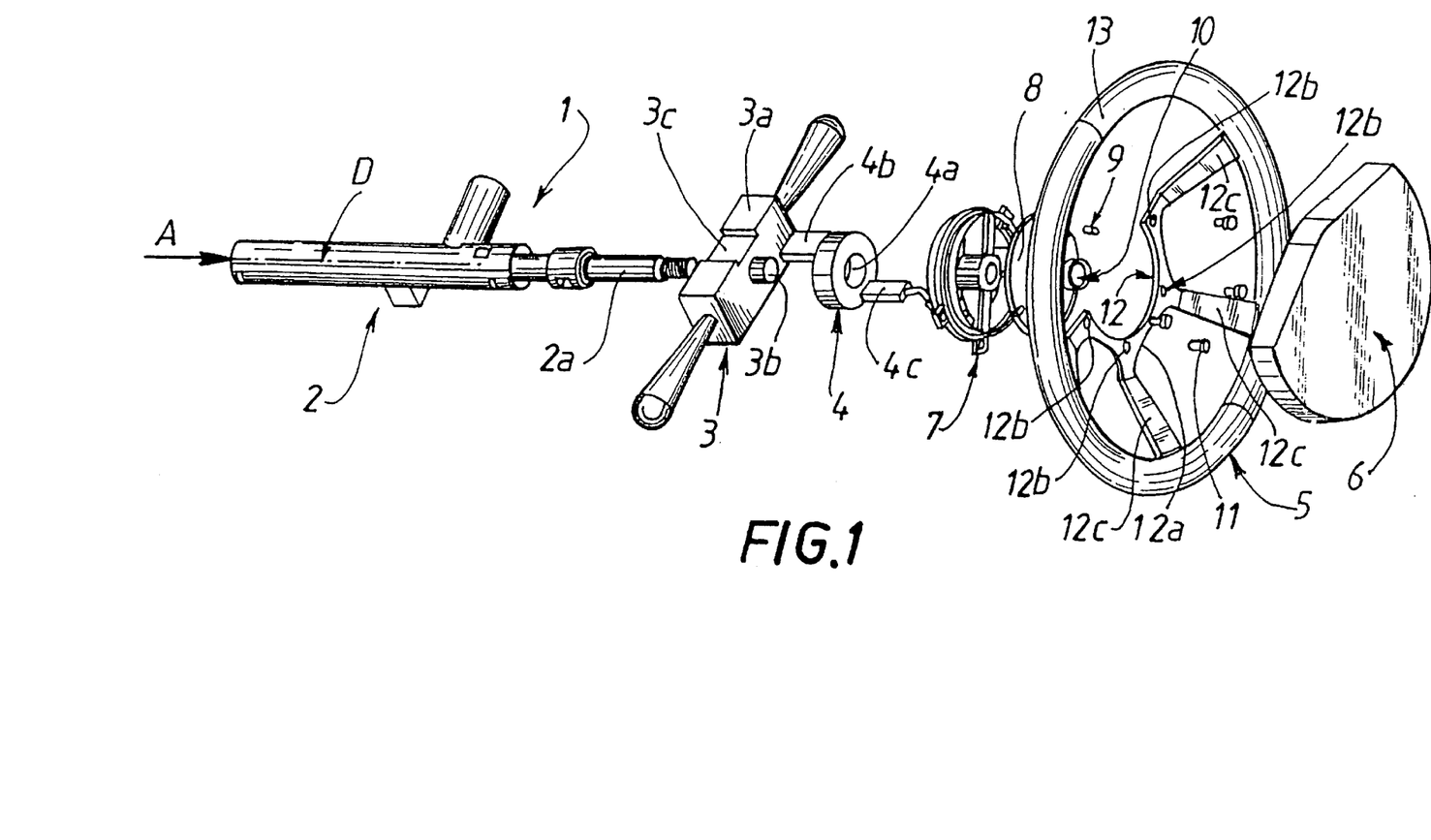
FIG. 1 is a schematic view in exploded perspective of a vehicle steering device comprising a steering wheel with an attached torque sensor, according to one embodiment of the invention.
Figure 2:
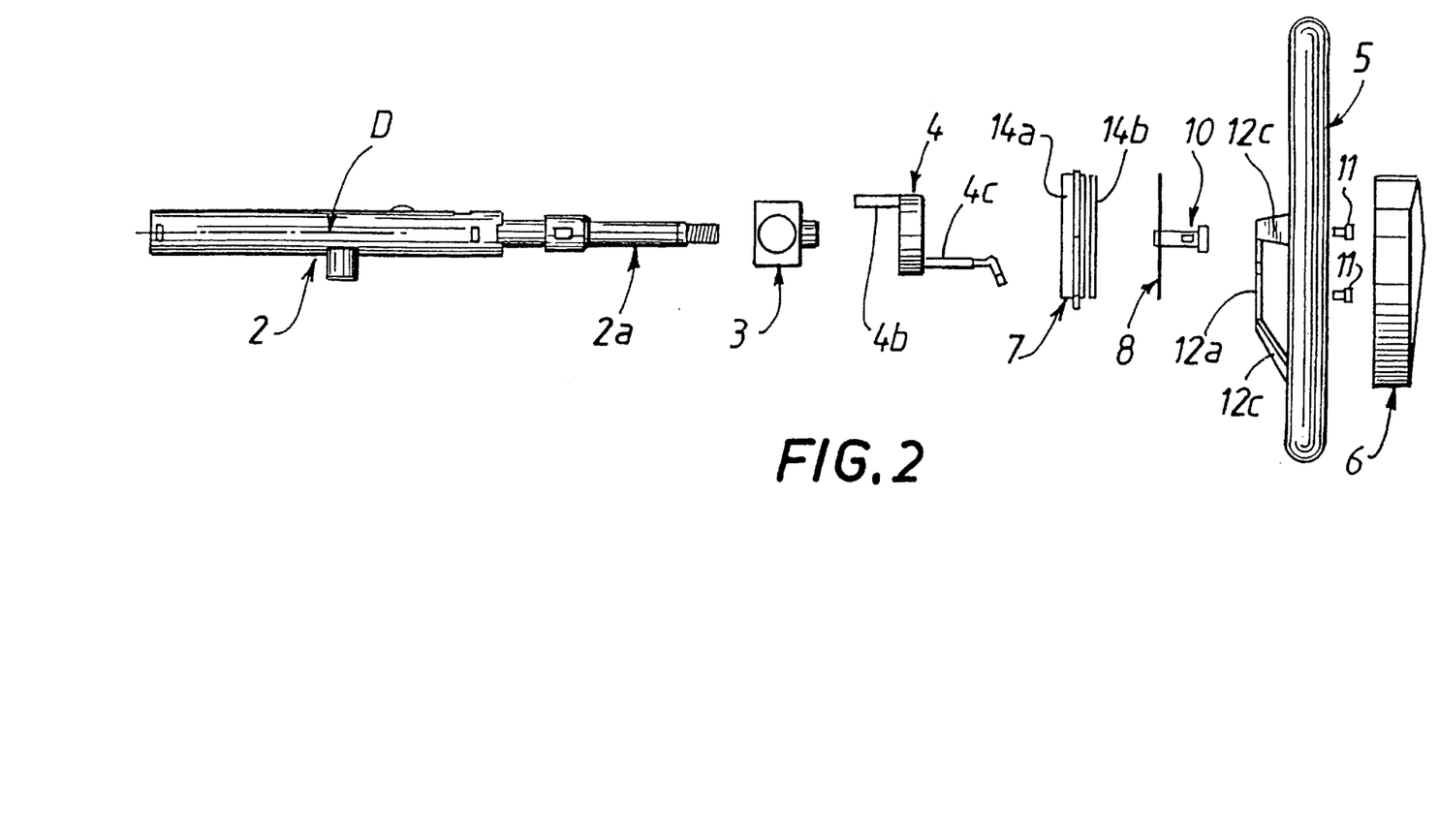
FIG. 2 is an exploded schematic side view corresponding to FIG. 1.

Reference is made first of all to FIG. 1.

The steering device 1, depicted schematically in exploded perspective in FIG. 1, is intended to be integrated into a vehicle, for example a motor car.

This device 1 comprises a steering column 2. This column 2 can be telescopic, where appropriate, and/or have an inclination which is variable with respect to the bodywork or driver.

A control assembly 3 under the steering wheel is associated with the steering device.

The control assembly 3 under the steering wheel comprises a central block 3a having a through hole 3b with a diameter such that the assembly 3 can be fitted on the end part 2a of the transmission shaft of the column 2.

In the embodiment depicted, the end part 2a of the transmission shaft has a substantially circular transverse section, the through hole 3b also being circular in transverse section i.e. perpendicular to the principal axis D of the steering device 1.

The steering device 1 comprises a rotating connector 4 provided with two bars 4b, 4c and a through central hole 4a.

The bar 4b is intended to be held in position in a groove 3c provided on the central block 3a of the control assembly 3 under the steering wheel.

The steering device 1 comprises a torque meter whose sensing element is integrated into the hub 7 of the steering wheel 5.

When necessary, as depicted in FIG. 1, the steering wheel 5 has in its central part an inflatable airbag box 6.

In this case, the rotating connector 4 can serve for the connection of the inflatable airbag box 6 and for the connection between the electronic circuit 8 of the power steering torque meter and the power assistance means (electric motor, hydraulic circuit control device etc).

The rotating electrical connector can be of the type having a first fixed casing element, a second casing element, concentric with the first fixed casing element, and able to move in rotation with respect to it, and a flexible electrically conductive member wound in a spiral between the fixed element and the movable element of the casing.

The steering device 1, in certain embodiments, may not have an inflatable airbag box.

The steering wheel 5 has a rim 13 and a frame 12.

In the embodiment depicted, the frame 12 is in the form of a transverse arch 12a connected to the rim 13 by four inclined arms 12c.

The transverse arch 12a has through holes 12b allowing the passage of screws 11 for fixing the hub 7 to the steering wheel 5.

In other embodiments, the hub is made in one piece with the frame of the steering wheel 5 rather than being attached to the latter.

The rim 13 of the steering wheel 5 can, in certain embodiments, be formed from at least two substantially complementary tubes in the form of portions of rings, each tube having a curved portion forming a portion of the rim, at each end of which there is provided a radially folded portion, one end of which supports means of connection with the hub.

The frame of the steering wheel 5 can be produced from aluminium alloy, magnesium-based alloy, semi-crystalline thermoplastic, metallic-matrix composite material, or any other equivalent material.

In one embodiment, the frame of the steering wheel is produced from pressed sheet metal.

Where necessary, the metallic or other skeleton of the steering wheel 5 can be covered with an expanded casing made of plastics material, for example moulded onto the skeleton.

In some embodiments, the steering wheel can have parts covered with one or more natural products, in particular a cladding of leather or precious wood.

Figure 3:
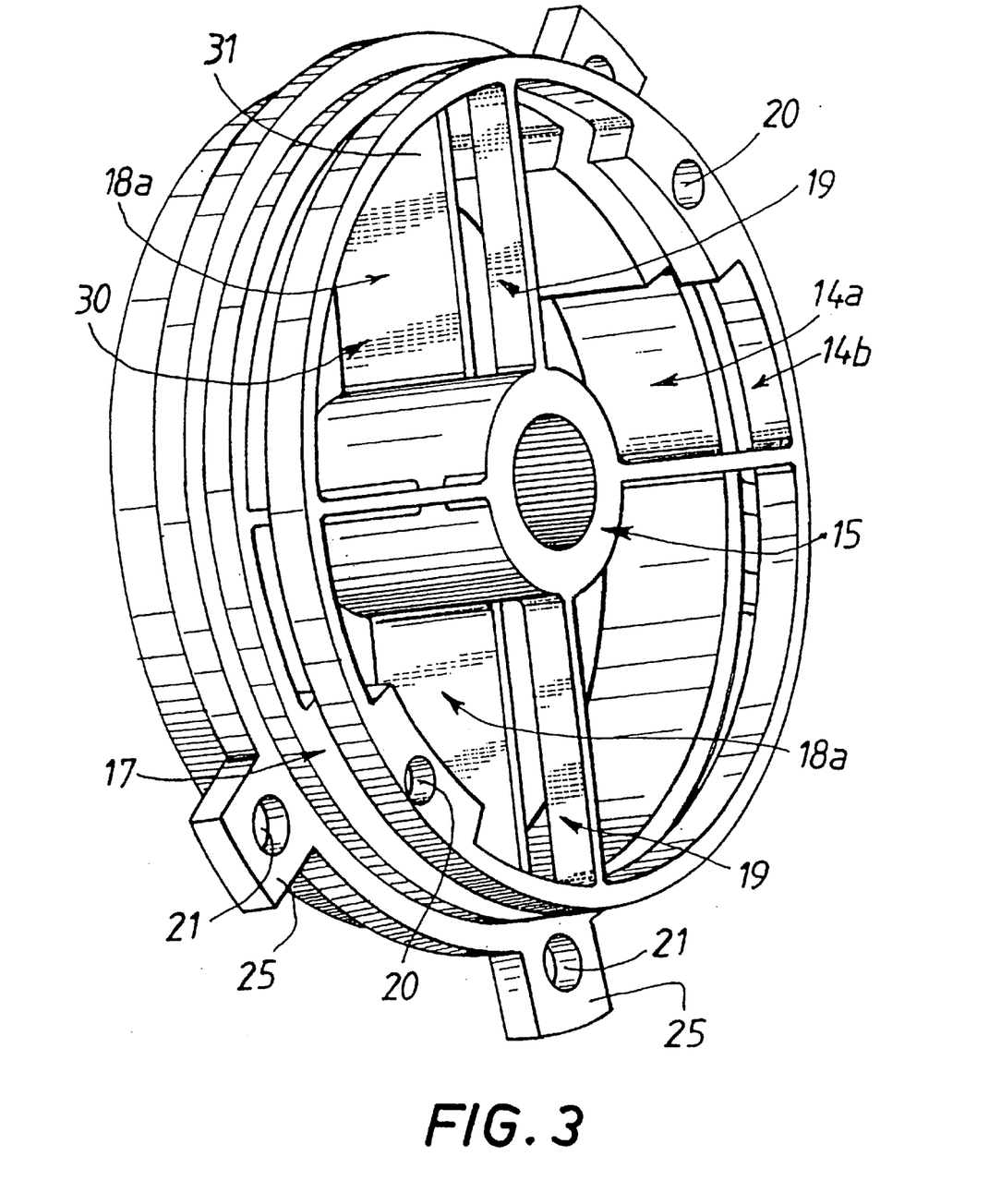
FIG. 3 is a perspective view of a hub with a flexion sensing element according to one embodiment.

The hub 7 will now be described with reference to FIG. 3 et seq.

In a first embodiment, the hub 7 has a flexion sensing element.

The hub 7 has a cylindrical internal ring 15 and two external rings 14a, 14b connected to the internal ring 14 by elastic beams 18a deformable under flexion and non-deformed beams 19.

More precisely, the rear external ring 14a, fixed to the hub 7 of the steering wheel 5 by screws 11 passing through the holes 21, is connected to the internal ring 15 by means of elastic beams 18a deformable under flexion.

The external rings 14a, 14b are substantially coaxial and have the same mean diameter.

In the embodiment depicted, the deformable beams 18a are four in number, evenly distributed perpendicularly to the principal axis D.

In other embodiments, not shown, the deformable beams are two, three or more than four in number.

The front external ring 14b is connected to the internal ring 15 by means of non-deformed radial beams 19, a web or any other substantially rigid means of connection.

In the embodiment depicted, there are the same number of non-deformed beams 19 as there are beams elastically deformable under flexion 18, the beams 18a, 19 being situated substantially on two radial planes perpendicular to the principal axis D.

In other embodiments, not shown, the beams 19 are two, three or more than four in number, the number of beams 18a being four.

In other embodiments, the thickness or height of at least one elastically deformable beam 18a varies from its foot 30 to its head 31.

The movable external ring 14a of the hub 7 is rigidly connected with the arch 12a of the steering wheel 5, the screws 11 passing through the holes 12b in the arch in order to reach the holes 21 provided in the attachment lugs 25 on the external ring 14a.

At the same time, a screw 10 fixes the steering wheel 5 to the column 2, the control assembly 3 under the steering wheel, the rotating connector 4, the hub 7, being sandwiched between the arch 12a of the steering wheel 5 and the steering column 2, over a length corresponding to the end part 2a of the transmission shaft of this column 2.

The electronic circuit 8 can be attached by adhesive bonding or any other equivalent means, on the front face of the hub 7.

When the driver exerts a force on the rim 13 of the steering wheel 5, the rear external ring 14a fixed to the steering wheel 5 causes a bending deformation of the beams 18a, a deformation which is as great as the load moment on the transmission shaft of the column 2 is great.

The front external ring 14b, for its part, remains substantially unstressed, its position thus being able to serve as a reference basis for measuring the movement of the external ring 14a.

The front external ring 14b carries sensors 9 for small movements, from around a few microns to a few tens of microns at a minimum.

In the embodiment depicted, these sensors are two in number and are disposed in axial housings 20 provided in the front ring 14b, in line with the ring 14a.

These sensors 9 can be of any suitable type: optical, capacitive, electromagnetic etc sensors.

In one embodiment, these sensors are Hall effect sensors.

In another embodiment, these sensors are magnetoresistance (MR) or giant magnetoresistance (GMR) probes.

Although a single Hall effect sensor 9 can suffice to measure small movements, it is possible, for reasons of reliability, to dispose several probes in the measuring gap 17 in order to create redundancy.

Each of the Hall effect sensors can have its own associated electronic circuit.

By comparing or combining the signals delivered by two, three or four different probes, it is possible to detect any failure of one of the probes and to provide excellent reliability for the torque meter.

The number of deformable beams 18a, their angular distribution, the thickness and height of the beams, and the material used for producing them, determine, as is clear to a person skilled in the art, the following characteristics:

the modulus of inertia;

the maximum stress in the beams, for a given maximum torque, for example a breaking stress;

the value of the minimum measurable torque, by means of a given small-movement measuring technique.

The sensing element can be produced from a material chosen from amongst the group comprising steels, cast irons, aluminium alloys or magnesium alloys.

A 35NCD16 steel, a spheroidal graphite cast iron or an aluminium in the 7000 series can for example be envisaged.

The sensing element can be cast or machined, depending on the material used, the geometry of the beams and the acceptable cost in particular, as can be determined by a person skilled in the art.

Figure 8:
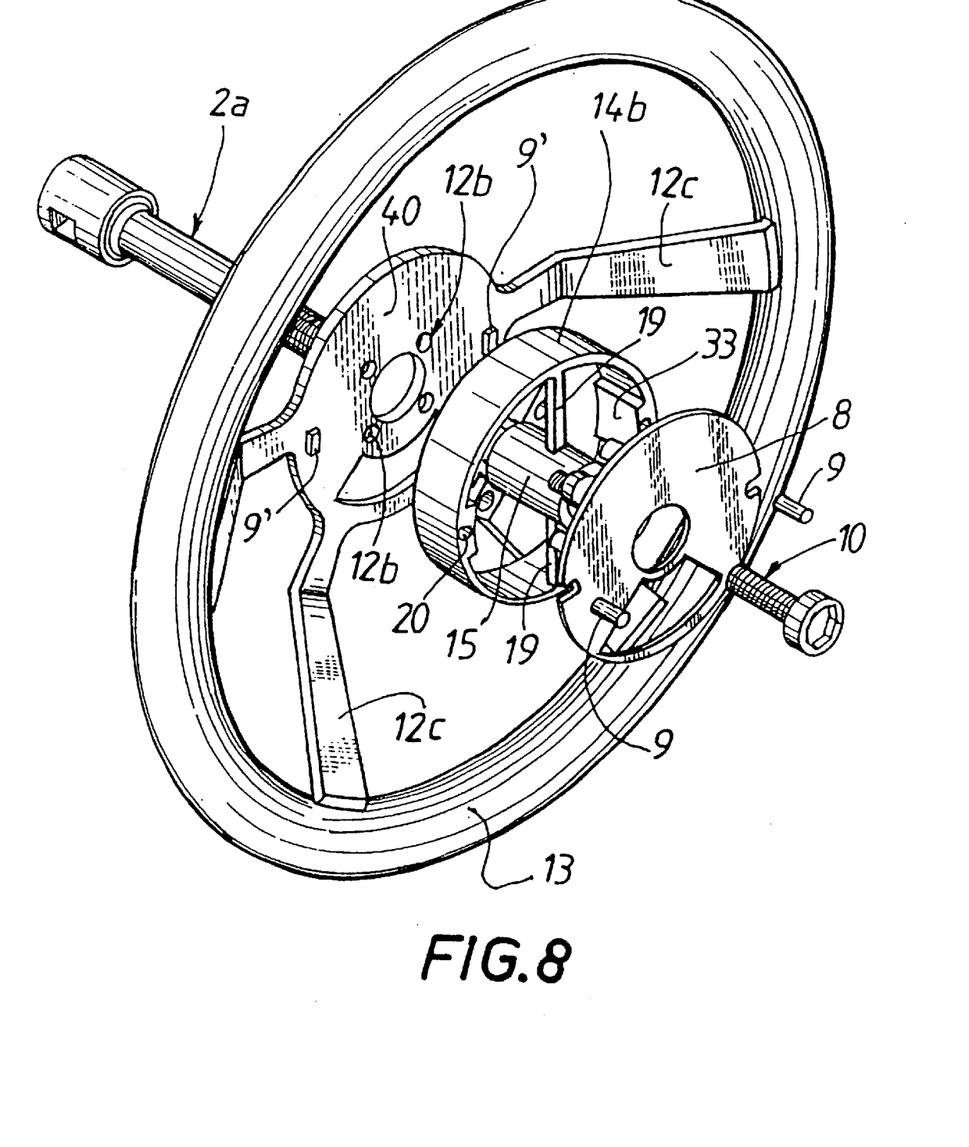
FIG. 8 is an exploded view in schematic perspective of a steering device having a hub with a torsion sensing element.
Figure 9:
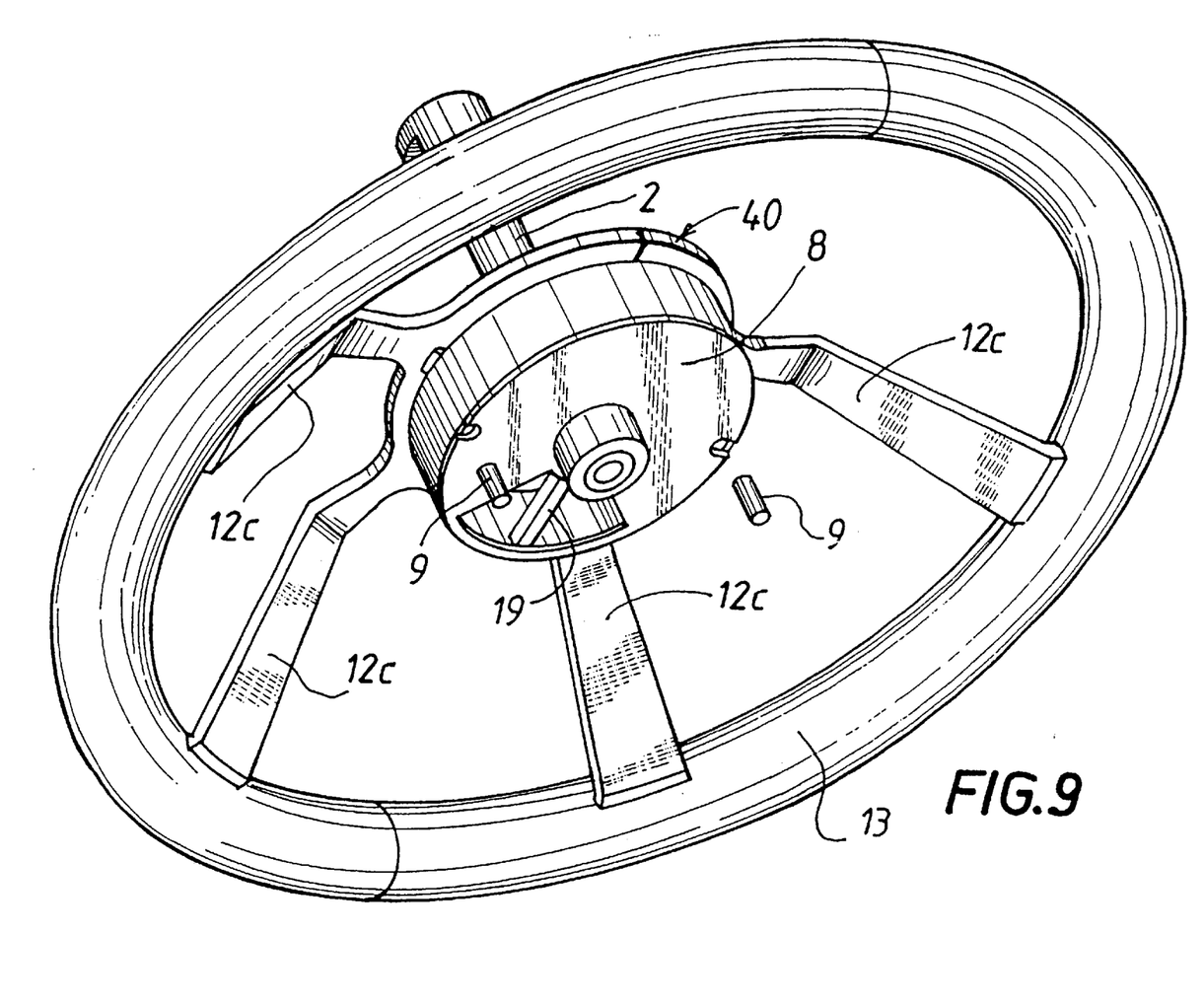
FIG. 9 is a view in perspective of the device depicted in FIG. 8, in the assembled position, the sensors being removed from their housing.
Figure 10:
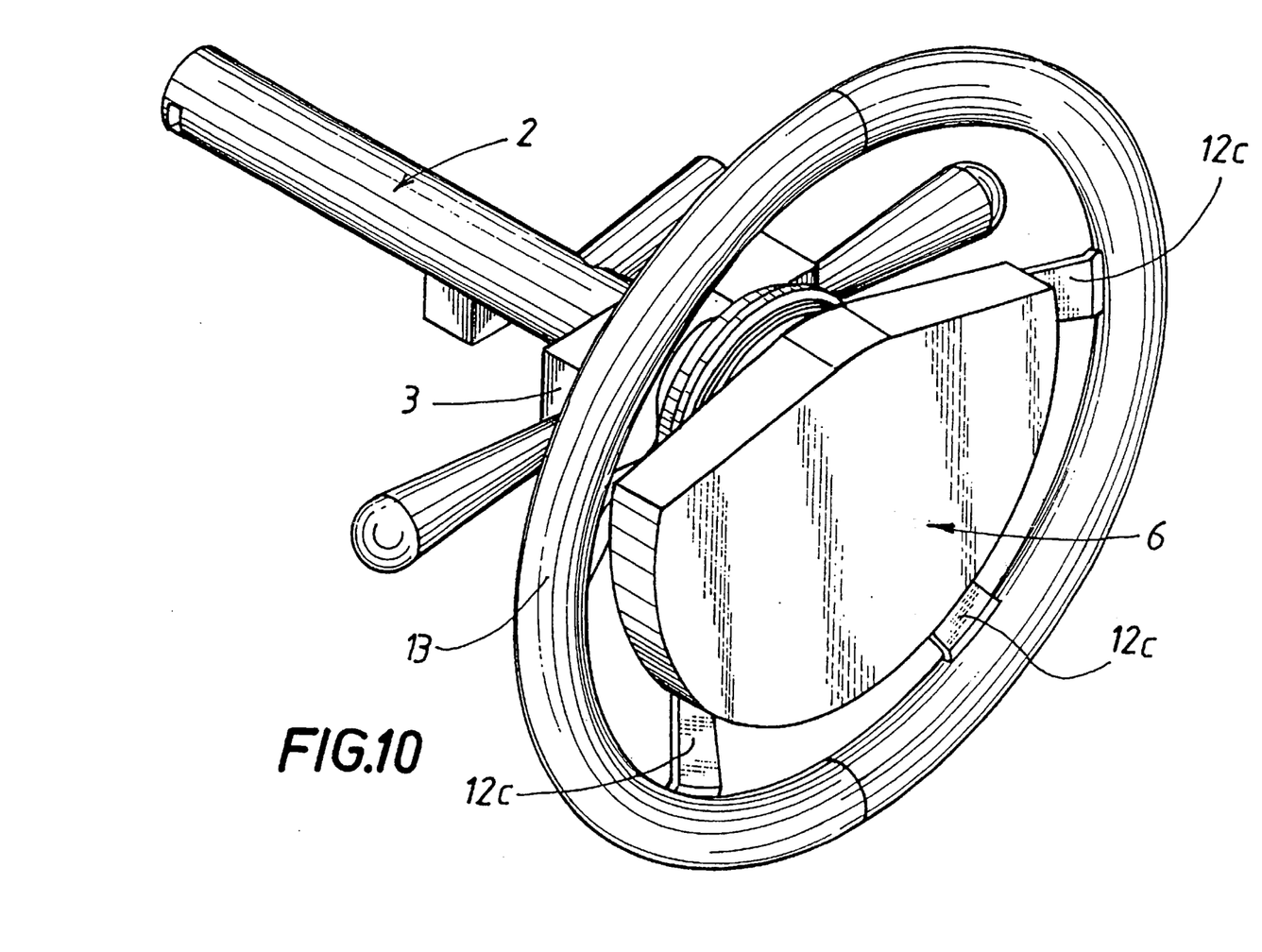
FIG. 10 is a perspective view of a steering device, corresponding to FIGS. 1, 4 and 8, the inflatable airbag box being disposed in the central part of the steering wheel.
Figure 11:
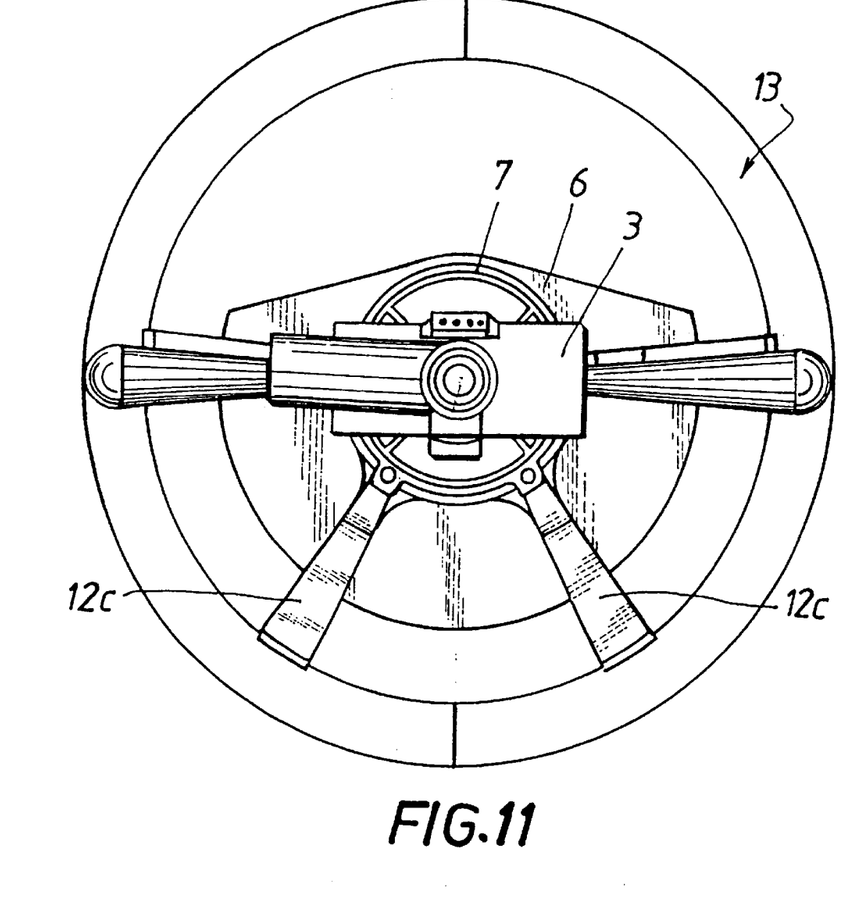
FIG. 11 is a rear view in the direction of the arrow A of the device depicted in FIG. 1, after assembly.
Figure 12:
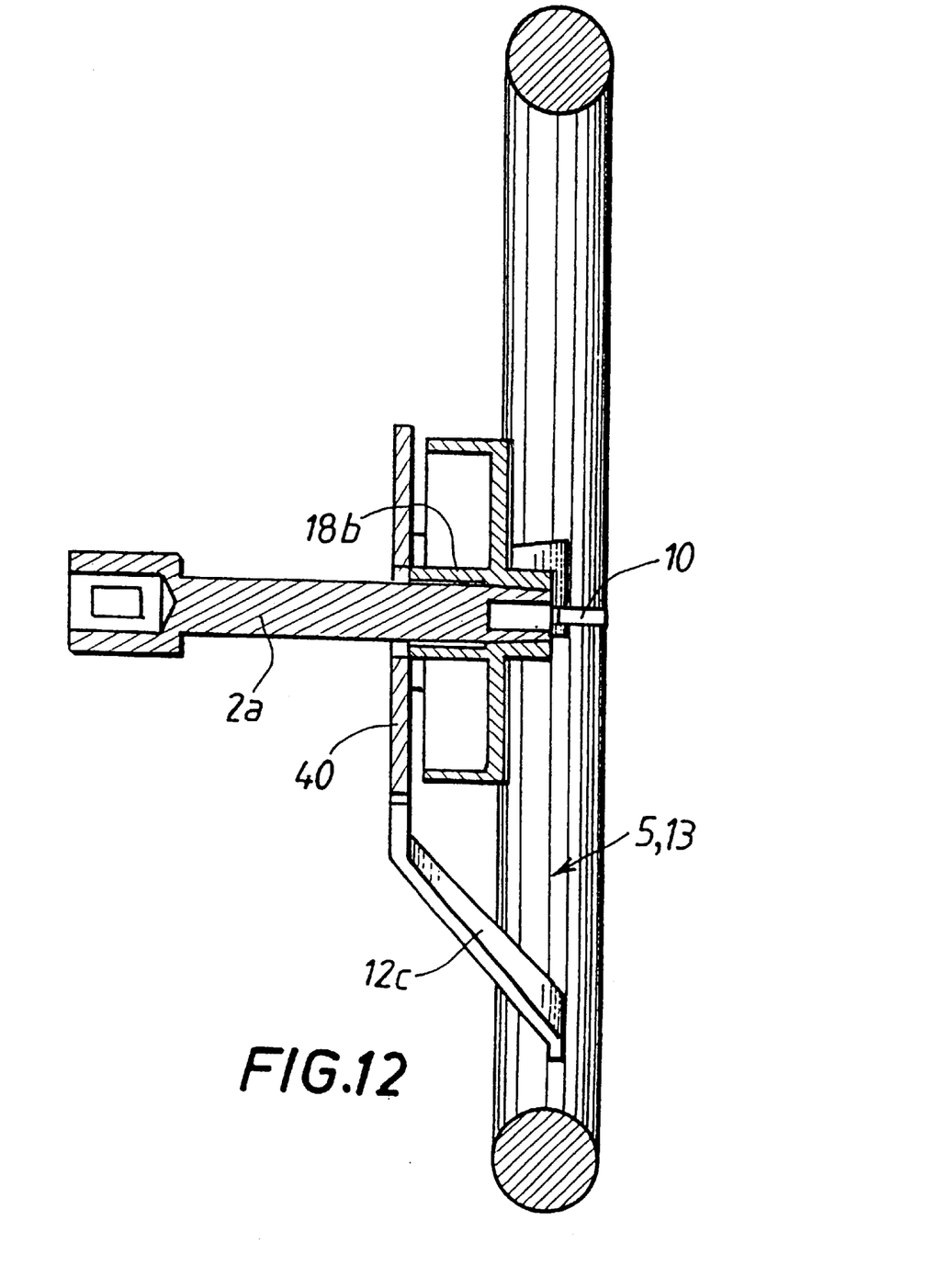
Figure 13:
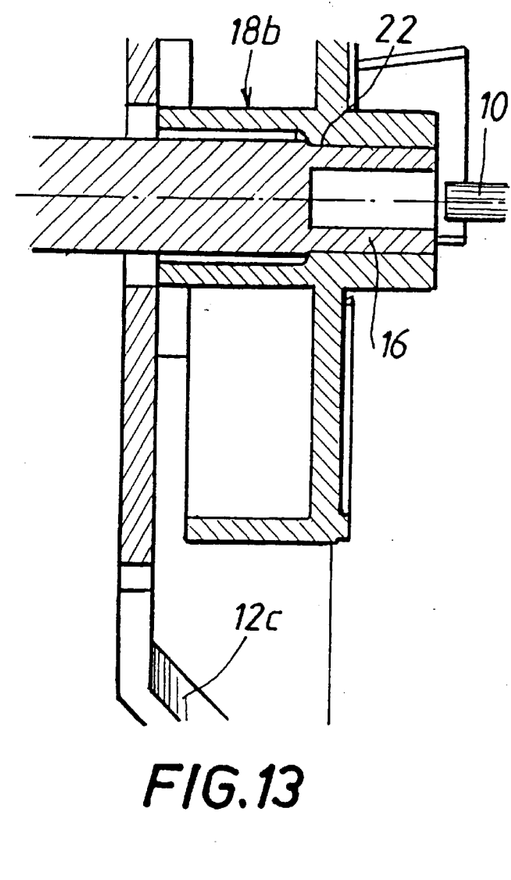

Reference is now made to FIG. 8, which illustrates an embodiment of a hub with a torsion sensing element.

The hub 7 has an unstressed external ring 14b with a substantially cylindrical external peripheral surface.

This ring 14b is provided with two housings 20 provided in two diametrically opposed protrusions 33.

Between these protrusions 33, the internal surface of the ring 14b is substantially cylindrical.

The ring 14b is connected to the internal ring 15 by at least one beam 19, a web or any substantially rigid connecting element.

In the embodiment depicted, two radial beams 19 or one web, made in one piece with the internal ring 15 and the unstressed external ring 14b, connect these two rings 15, 14a.

The beams 19 have a substantially constant square cross-section from their foot to their head and are substantially aligned, in the embodiment depicted.

The internal ring 15 has a through hole defining a fluted joining piece 16 and, opposite, a bearing surface 22 for the fluted joining piece on the transmission shaft of the steering column 2, when the sensing element is intended to be incorporated in a steering column.

A tube 18b deformed under torsion connects the internal ring 15 to the movable external ring 14a.

This movable external ring 14a is connected rigidly to the means of applying torque to the column 2, namely the steering wheel 5.

Screws 11 provide, via the holes 21, the fixing of the hub 7 to the transverse central plate 40 of the frame 12 of the steering wheel 5.

This plate 40 is provided with holes 12b corresponding to the hole 21 in the hub 7.

Figure 4:
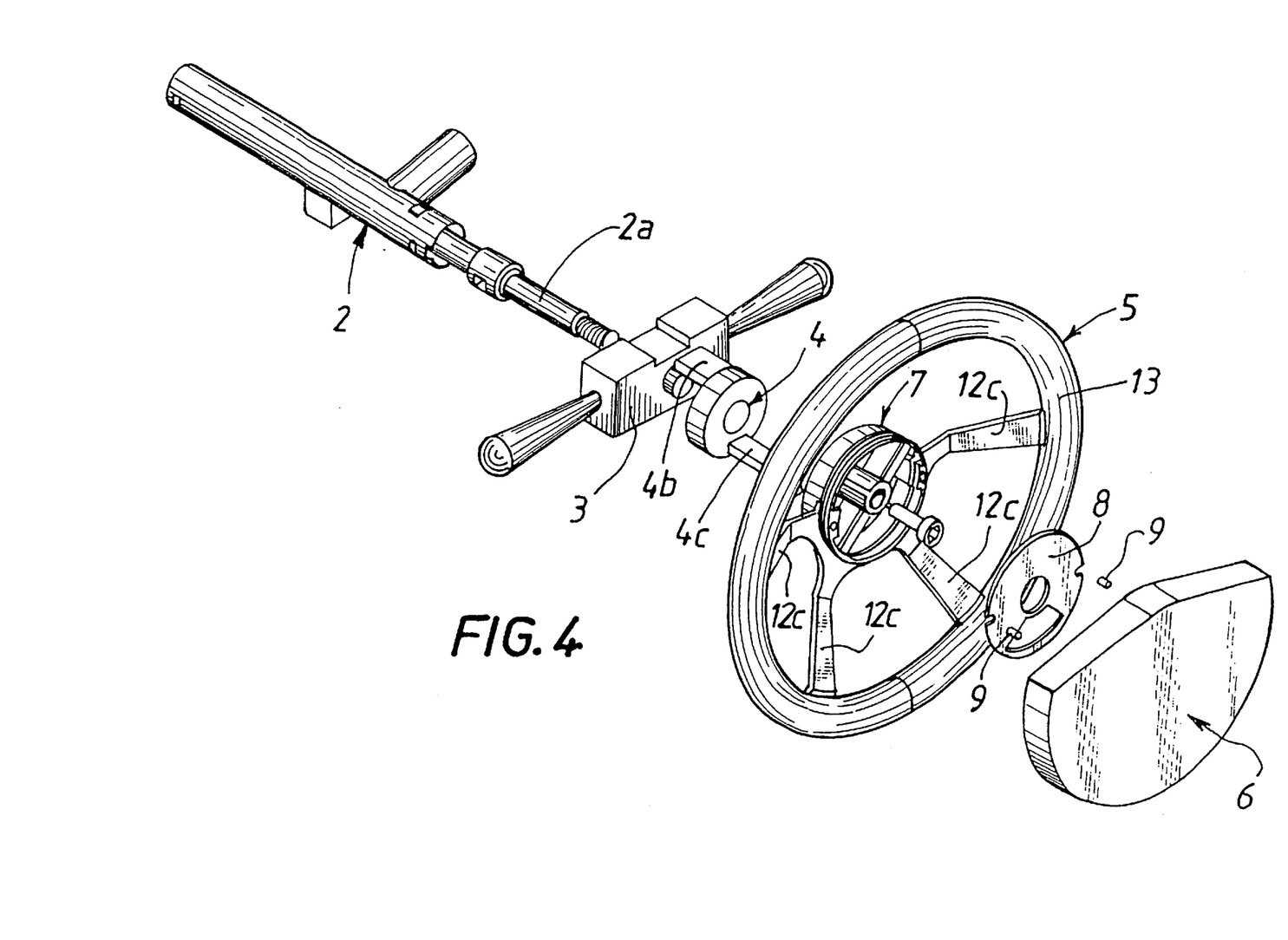
FIG. 4 is a view corresponding to FIG. 1, the hub with a flexion sensing element being integrated into the steering wheel rather than attached to it.
Figure 5:
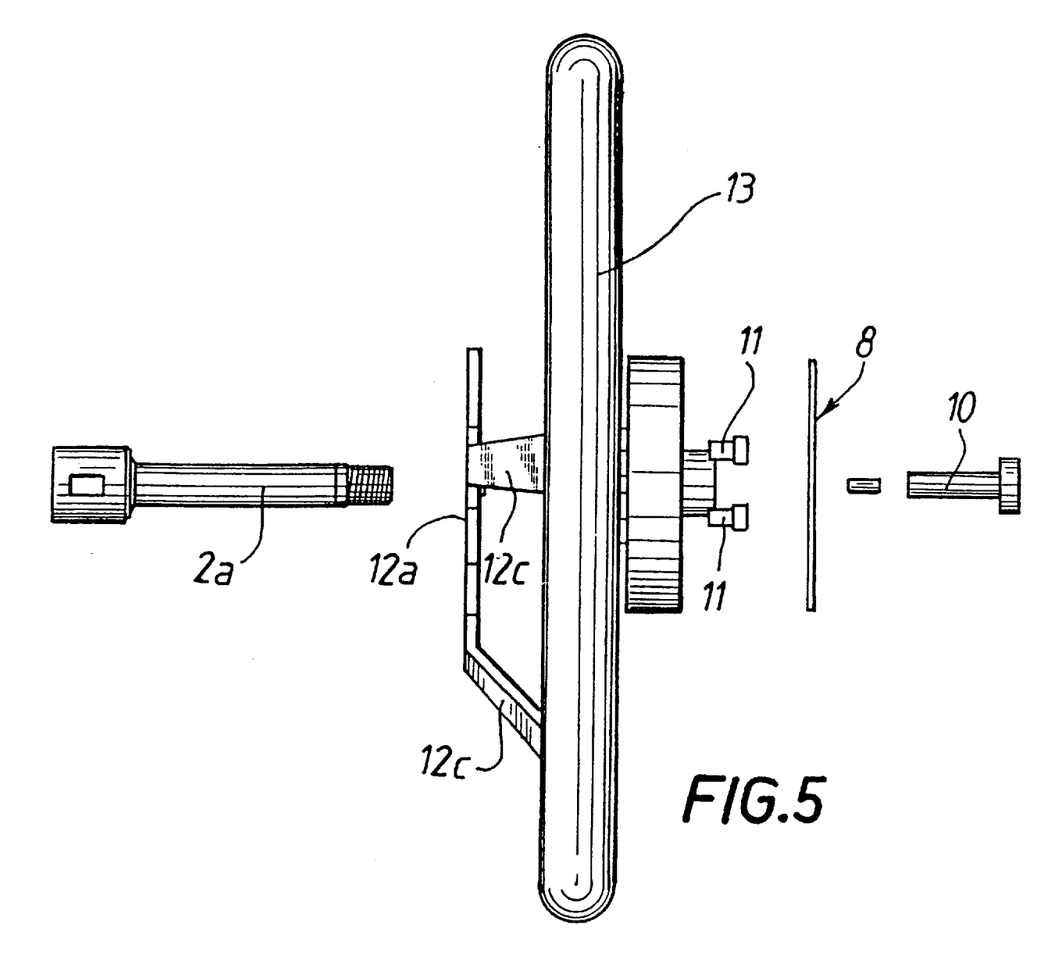
FIG. 5 is an exploded schematic side view, corresponding to FIG. 4.
Figure 6:
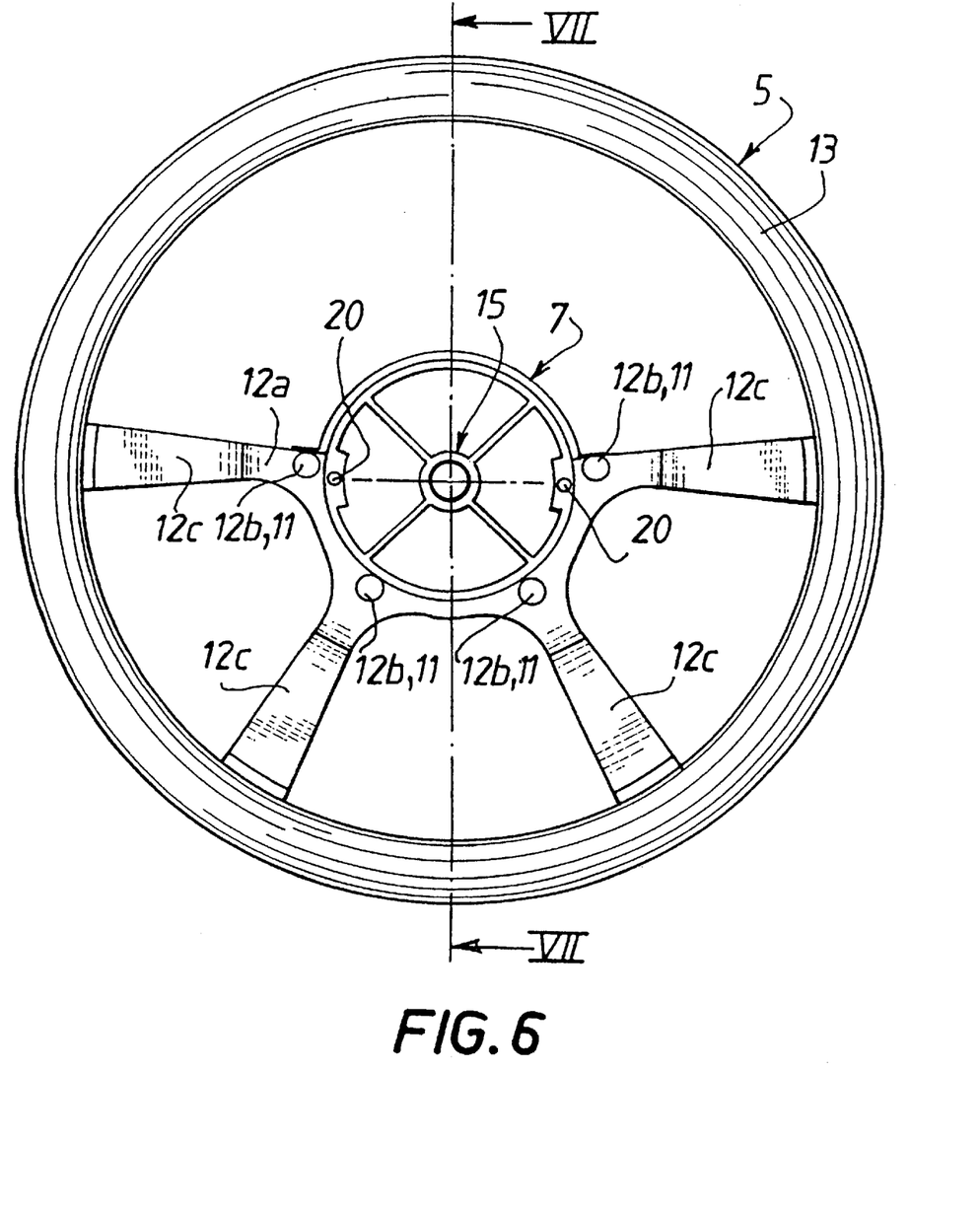
FIG. 6 is a front view of the steering wheel and hub assembly as depicted in FIG. 4.
Figure 7:
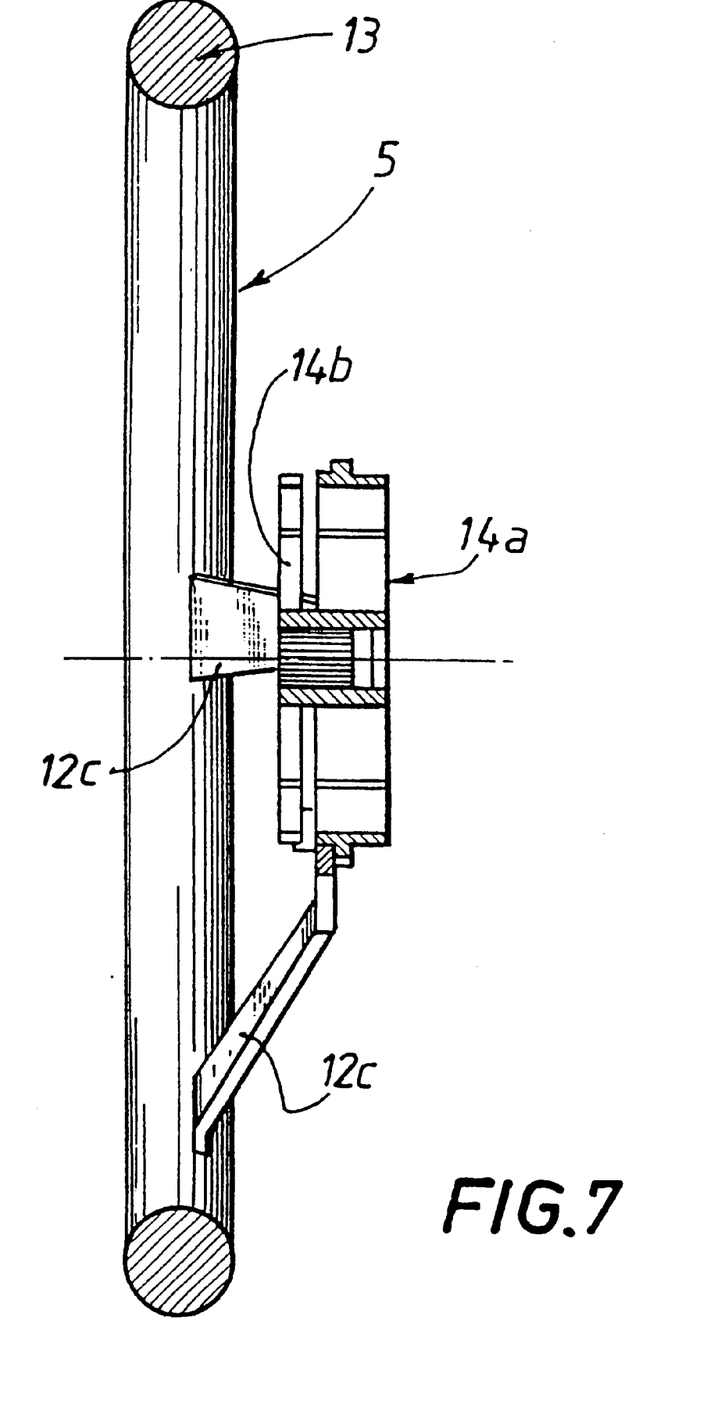
FIG. 7 is a view in transverse section along the line VII—VII in FIG. 6.

The frame 12 of the steering wheel has, just like in the embodiments presented in FIGS. 1 and 4, several inclined arms 12c connecting the transverse central plate 40 to the rim 13 of the steering wheel 5.

When the hub 7 is mounted on a steering wheel 5, as depicted in FIG. 8, the movable external ring 14a, fixed to the plate 40 and therefore to the rim 13 of the steering wheel 5, is moved in rotation with respect to the unstressed external ring 14b.

Measurement of this small movement, for example by means of Hall sensors 9 placed in the recesses 20 and magnets 9' fixed opposite the plate 40, makes it possible to measure the torque applied by the driver and affords control of the steering power assistance after processing of the signal by the electronic circuit 8.

The elastically deformable beams 18a are, in some embodiments, in the form of coils.

These coils have several bends separated by sectors which are straight or in the shape of an arc of a circle and concentric.

These coils lie, in some embodiments, substantially in the same plane perpendicular to the axis of the transmission shaft.

The beams which are deformable under flexion described above have, in some embodiments, cutouts.

When a torque is applied to the steering wheel 5, only the beams 18a which are not divided into two sections transmit the forces, and the two portions of the beams which are cut transmit a bending force only when a threshold applied torque is exceeded.

The production of these cutouts allows the use of the sensor as a torque limiter and can also or simultaneously permit the use of this sensor for several ranges of torque measurement.

The stiffness of the torque meter increases in fact as soon as a larger number of beams exceeds the unstressed state (two separated portions) to a stressed state (the two portions of the beams are in contact). The stiffness increases in this way when the torque applied increases, limiting the degree of deformation of the movable ring 14a.

What is claimed is:

1. A steering wheel frame for a motor vehicle comprising:
   a steering wheel (5) for controlling the direction of progress of the motor vehicle;
   ergonomic means (13) of gripping the steering wheel (5) for controlling the rotation of a steering shaft (2);
   means of mounting the steering wheel frame on the said steering shaft;
   means of measuring the stresses applied to the steering shaft by the maneuvering of the steering wheel;
   wherein the measuring means comprise at least one torque sensor comprising:
      a first movable external ring (14a);
      a second external ring (14b), substantially unstressed, positioned at a distance from the movable external ring (14a);
      an internal ring (15) fixed with respect to rotation to the steering shaft to which the torque to be measured is applied, the movable external ring (14a) being able to be fixed rigidly to the steering wheel frame, the movable external ring (14a) being connected to the internal ring (15) by at least one elastically deformable means (18a, 18b);
      the substantially unstressed external ring (14b) being connected to the internal ring (15) by at least one substantially unstressed means;
      the sensor comprising means (9, 9') of measuring small relative movements of the movable external ring (14a) with respect to the substantially unstressed external ring (14b) when a torque is applied to the steering shaft via the steering wheel frame; and
      and wherein the movable ring (14a), the substantially unstressed external ring (14b) and the internal ring (15) are made in one piece with their connecting elements (17a, 18b, 19) the substantially unstressed external ring (14b) carrying the means of measuring (9).

2. A steering wheel frame according to claim 1, characterized in that the elastically deformable means connecting the first movable external ring (14a) and the internal ring (15) is a beam (18a) extending radially from the internal ring (15) to the movable external ring (14a).

3. A steering wheel frame according to claim 2 including a plurality of elastically deformable beams (18a) extending radially from a foot (30) at the internal ring (15) to a head (31) at the first movable external ring (14a).

4. A steering wheel frame according to claim 3, characterized in that the beams (18a) are equidistant from each other.

5. A steering wheel frame according to claim 3, characterized in that the height of at least one elastically deformable beam (18a) varies from its foot (30) to its head (31).

6. A steering wheel frame according to claim 3, characterized in that the thickness of at least one elastically deformable beam (18a) varies from its foot (30) to its head (31).

7. A steering wheel frame according to claim 1, characterized in that the substantially unstressed means connecting the second substantially unstressed external ring (14b) and the internal ring (15) is a beam (19) extending radially from the internal ring (15) to the second substantially unstressed external ring (14b).

8. A steering wheel frame according to claim 7 including a plurality of beams (19) substantially free from stress, extending radially from the internal ring (15) to the second unstressed external ring (14b) and connecting them.

9. A steering wheel frame according to claim 8, characterized in that the beams (19) substantially free from stress are equidistant from each other.

10. A steering wheel frame according to claim 9, characterized in that the beams substantially free from stresses (19) are substantially disposed in the same radial planes as the deformable beams (18a).

11. A steering wheel frame according to claim 9, characterized in that the beams substantially free from stress (19) have a geometry substantially identical to that of the elastically deformable beams (18a).

12. A steering wheel frame according to claim 10, characterized in that the elastically deformable beams (18a) and the beams substantially free from stress (19) are each four in number.

13. A steering wheel frame according to claim 1, characterized in that the elastically deformable means connecting the movable external ring (14a) to the internal ring (15) is a tube which is deformable under torsion (18b).

14. A steering wheel frame according to claim 13, characterized in that the substantially unstressed means connecting the second external ring (14b) to the internal ring (15) is a beam (19) extending radially from the internal ring (15) to the movable external ring (14a).

15. A steering wheel frame according to claim 14 including two radial beams (19) disposed on a diameter of the substantially unstressed external ring (14b) connect it to the internal ring (15).

16. A steering wheel frame according to claim 1, characterized in that the means of measuring the small relative movement of the first movable external ring (14a) with respect to the second substantially unstressed external ring (14b) are chosen from amongst the group comprising optical detectors, electromagnetic detectors, capacitive detectors and equivalent.

17. A steering wheel frame according to claim 16, characterized in that the measuring means comprise at least one Hall effect sensor (9) disposed in a housing (20) in the second substantially unstressed external ring (14b).

18. A steering wheel frame according to claim 16, characterized in that the torque sensor is associated with an electronic circuit (8) for processing the signal coming from the measuring means.

19. A steering wheel frame according to claim 18 including an inflatable airbag box and power assistance means wherein a rotating connector serves for the connection of the inflatable airbag box and for the connection of the electronic circuit to the torque sensor and the power assistance means.

20. A steering wheel frame according to claim 19 wherein the rotating connector has a first fixed casing element, a second casing element concentric with the first fixed casing element, and able to move in rotation with respect to it, and a flexible electrically conductive member wound in a spiral between the first fixed casing element and the second movable casing element.

21. A steering wheel frame according to claim 1, characterized in that the steering shaft (2) is a component of a steering column mechanically connecting the steering wheel (5) to wheels of the motor vehicle.

22. A steering wheel frame according to claim 1, characterized in that the steering shaft is a main shaft of a decoupled steering device.

23. A steering wheel frame according to claim 1 including an annular rim (13) and at least one generally radial arm (12) connecting the rim to the stress measuring means.

24. A steering wheel frame according to claim 1 including at least one ergonomic grip for gripping the steering wheel.

25. A steering wheel frame according to claim 23, characterized in that the rim (13) comprises at least two substantially complementary tubes in the form of a portion of a ring, each tube having a curved portion forming a portion of the rim and at least one radially folded end part forming at least part of an arm of the frame.

26. A steering wheel frame according to claim 23 including at least two substantially radial arms (12).

27. A steering wheel frame according to claim 23, characterized in that each radial arm is connected to the rim.

28. A steering wheel frame according to claim 27, characterized in that the end part of one or each arm is inserted in a corresponding slot in the rim.

29. A steering wheel frame according to claim 27, characterized in that the radial arm or arms (12) are made of pressed sheet metal, the end part of one or each arm being wound onto the rim and welded thereto.

30. A steering wheel frame according to claim 23 produced from a material chosen from amongst the group comprising steels, aluminum alloys, cast irons, magnesium alloys, thermoplastic or metallic-matrix composites.

31. A steering wheel frame according to claim 1 including a means of connecting an inflatable airbag device.

32. A steering wheel frame according to claim 31 wherein the connecting means includes one of an insert covered in a padding, an inflatable airbag mechanism being enclosed in the padding, and a plate connecting the means of gripping the steering wheel to the steering shaft.

\* \* \* \* \*